(12) United States Patent
Jang et al.

(10) Patent No.: US 7,411,903 B2
(45) Date of Patent: Aug. 12, 2008

(54) METHOD OF GENERATING TRANSMISSION CONTROL PARAMETERS AND METHOD OF SELECTIVE RETRANSMISSION ACCORDING TO PACKET CHARACTERISTICS

(75) Inventors: Kyung-hun Jang, Suwon (KR); Jong-ae Park, Yongin (KR); Hyo-sun Hwang, Suwon (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 863 days.

(21) Appl. No.: 10/616,034

(22) Filed: Jul. 10, 2003

(65) Prior Publication Data

US 2004/0027991 A1 Feb. 12, 2004

(30) Foreign Application Priority Data

Jul. 26, 2002 (KR) .................. 10-2002-0044304

(51) Int. Cl.
*H04L 12/26* (2006.01)
(52) U.S. Cl. ...................... 370/230; 714/746
(58) Field of Classification Search .............. None
See application file for complete search history.

(56) References Cited

U.S. PATENT DOCUMENTS

| | | | | |
|---|---|---|---|---|
| 5,708,473 | A * | 1/1998 | Mead ................ | 375/240.15 |
| 6,108,382 | A | 8/2000 | Gringeri et al. | |
| 6,144,653 | A * | 11/2000 | Persson et al. .......... | 370/337 |
| 6,658,019 | B1 * | 12/2003 | Chen et al. ............. | 370/465 |
| 6,732,313 | B2 * | 5/2004 | Fukushima et al. ...... | 714/748 |
| 6,967,924 | B1 * | 11/2005 | Aimoto ................. | 370/235 |
| 2002/0004838 | A1 | 1/2002 | Hakenberg et al. | |
| 2002/0188648 | A1 * | 12/2002 | Aweya et al. ............ | 709/102 |

(Continued)

FOREIGN PATENT DOCUMENTS

EP 1 006 689 A2 6/2000

(Continued)

OTHER PUBLICATIONS

B. Zheng and M. Atiquzzaman, "A Novel Scheme for Streaming Multimedia to Personal Wireless Handheld Devices," IEEE Transactions on Consumer Electronics, vol. 49, No. 1, Feb. 2003.*

(Continued)

*Primary Examiner*—Kwang B. Yao
*Assistant Examiner*—Jutai Kao
(74) *Attorney, Agent, or Firm*—Lee & Morse, P.C.

(57) ABSTRACT

A method for generating packet-based transmission control parameters includes (a) receiving class information of an audio-video (AV) application and characteristic information of an AV packet, from the AV application, (b) receiving status information of a wireless channel and buffer storage time information of the AV packet, from a medium access control (MAC) layer, and (c) generating and outputting the packet-based transmission control parameters on the basis of the received information. In addition, a selective retransmission method includes (a) transmitting packets of an MPEG-2 frame in real-time, (b) checking for any transmission error after the transmission, and (c) if any transmission error is generated, retransmitting only packets of an I-frame. Therefore, it is possible to efficiently support AV service in wireless communication by dynamically controlling transmission control parameters according to a buffer status and by reflecting the characteristics of the AV frames.

17 Claims, 9 Drawing Sheets

U.S. PATENT DOCUMENTS

| | | | |
|---|---|---|---|
| 2003/0093485 A1* | 5/2003 | Dougall et al. | 709/208 |
| 2004/0203815 A1* | 10/2004 | Shoemake et al. | 455/450 |
| 2005/0036546 A1* | 2/2005 | Rey et al. | 375/240.12 |
| 2006/0130104 A1* | 6/2006 | Budagavi | 725/105 |

FOREIGN PATENT DOCUMENTS

| | | |
|---|---|---|
| EP | 1 006 689 A3 | 6/2000 |
| EP | 1 009 138 A2 | 6/2000 |
| EP | 1 009 138 A3 | 6/2000 |
| WO | WO 00/33503 A1 | 6/2000 |
| WO | WO 02/056553 A2 | 7/2002 |
| WO | WO 02/056553 A3 | 7/2002 |

OTHER PUBLICATIONS

Batra, et al. * Signal Processing: Image Communications 12(2):147-166 (1998), Elsevier Sci. Pub., *Entitled: Effective algorithms for video transmission over wireless channels.

* cited by examiner

METHOD OF GENERATING TRANSMISSION CONTROL PARAMETERS AND METHOD OF SELECTIVE RETRANSMISSION ACCORDING TO PACKET CHARACTERISTICS

BACKGROUND OF THE INVENTION

1. Field of the Invention

The present invention relates to a quality of service (QoS) control layer structure and packet-based transmission control parameters for supporting QoS in a communication system. More particularly, the present invention relates to a method of generating packet-based transmission control parameters and a QoS control layer structure for providing high quality audio-video (AV) service by reflecting characteristics of AV data in the scheduling process.

2. Description of the Related Art

Parameters used for supporting quality of service (QoS) in a communication system specify application characteristics, delay time, a difference between transmission delay times, a priority level, and the like. Application characteristics represent information related to whether the application data is transmitted in real-time or using a fixed bandwidth. The delay time and the difference between the transmission delay times represent information related to the time period of data transmission. The priority level represents information related to transmission sequencing of data.

In conventional methods of supporting QoS in media access control (MAC) layers, transmission control parameters are designated individually for respective sessions that are managed by each application. Therefore, scheduling or a retransmission mechanism, or the like, is managed by the individual transmission control parameters of the respective session.

Meanwhile, data frames used for providing an audio-video (AV) service have different characteristics between each frame, contrary to general data frames, all of which have generally similar characteristics. Therefore, it is inefficient to use conventional general QoS management for AV service in which the respective sessions are managed separately. In addition, conventional systems statically determine transmission control parameters according to the characteristics of the sessions. Therefore, such conventional systems cannot accurately reflect the characteristics of the AV frames described above.

In particular, certain frames (for example, an I-frame (Intra-coded frame) and a B-frame (Bidirectional-coded frame)) within an MPEG-2 stream have different characteristics from each other, contrary to the general data frames, all of which have the same characteristic as described above. For providing AV service, data should be transmitted in real-time. For real-time transmission and to achieve QoS, the transmission delay time of the data and the difference between the transmission delay times of the data must be maintained. For this reason, the MPEG-2 data (frames) should be transmitted according to their characteristics.

However, in a conventional wireless communication system, MPEG-frames are transmitted according to scheduling in the MAC layer using QoS parameters defined for the respective sessions, in the same manner as a general data transmission. In such conventional wireless communication systems, because the characteristics of the MPEG-2 frames are not reflected in the scheduling of the MAC layer, it is very difficult to provide real-time AV service.

SUMMARY OF THE INVENTION

The present invention provides a method of generating packet-based transmission control parameters and a QoS control layer structure, capable of providing high quality audio-video (AV) service, by reflecting characteristics of AV data in the scheduling process.

The present invention also provides a method, in which characteristics of AV frames are reflected by QoS control parameters (also referred to as transmission control parameters) for use in scheduling or retransmission. That is, a QoS control layer structure is provided that is capable of dynamically setting packet-based transmission control parameters that reflect the characteristics of the AV data. In addition, the present invention proposes transmission control parameters for use in the QoS control layer structure. Accordingly, the QoS control layer recognizes the status of a current channel while monitoring the status of a MAC layer and dynamically sets the transmission control parameters of the packets accordingly.

Further, the present invention provides a method that dynamically designates retransmission intervals of packets according to characteristics of the MPEG-2 frames and selectively retransmits the packets.

According to an aspect of the present invention, there is provided a method for generating packet-based transmission control parameters, the method including: (a) receiving class information of an audio-video (AV) application and characteristic information of an AV packet, from the AV application; (b) receiving status information of a wireless channel and buffer storage time information of the AV packet, from a medium access control (MAC) layer; and (c) generating and outputting the packet-based transmission control parameters on the basis of the received information.

According to another aspect of the present invention, there is provided a selective retransmission method including: (a) transmitting packets of an MPEG-2 frame in real-time; (b) checking for any transmission error after the transmission; and (c) if any transmission error is generated, retransmitting only packets of an I-frame.

According to yet another aspect of the present invention, there is provided a selective retransmission method for transmitting data of an MPEG-2 frame, including: (a) allowing a transmitting side medium access control (MAC) layer to transmit packets belonging to an I-frame to a receiving side MAC layer; (b) after all packets belonging to the I-frame are transmitted, allowing the receiving side MAC layer to output to the transmitting side MAC layer a retransmission request for non-received packets due to any transmission error generated during transmission of the packets; (c) allowing the transmitting side MAC layer, which received the retransmission request, to discard a number of packets of a B-frame following the I-frame, wherein the number of discarded packets of the B-frame equals a number of packets subject to the retransmission request; and (d) retransmitting the packets subject to the retransmission request.

According to still another aspect of the present invention, there is provided a selective retransmission method, by which a transmitting side medium access control (MAC) layer transmits packets of an MPEG-2 frame, including: (a) determining whether a packet, to be currently transmitted by the transmitting side MAC layer, belongs to an I-frame; (b) if the packet does not belong to the I-frame, transmitting the packet as is, and if the packet belongs to the I-frame, determining whether the packet is a start packet of the I-frame; (c) if the packet is the start packet of the I-frame, transmitting to a receiving side MAC layer an automatic retransmission start message including the number of packets belonging to the I-frame; and (d) preparing a buffer for use in an automatic retransmission request (ARQ) mode and transmitting the packets with their respective sequence numbers.

According to a further aspect of the present invention, there is provided a selective retransmission method, by which a transmitting side medium access control (MAC) layer transmits packets of an MPEG-2 frame, including: (a) starting an automatic retransmission request (ARQ) mode, and receiving a retransmission message of an MPEG-2 frame and sequence numbers of packets requiring retransmission, from a receiving side MAC layer; (b) receiving the retransmission message and the sequence numbers, determining whether any packets require retransmission, and if any packet requires retransmission, discarding a number of packets of a B-frame during a transmission standby state, wherein the number of discarded packets of the B-frame equals a total number of packets requiring retransmission; and (c) determining whether the number of the packets of the B-frame is less than the total number of packets requiring retransmission, and if the number of packets of the B-frame is not less than the total number of packets requiring retransmission, then retransmitting the packets and awaiting a next retransmission message.

According to yet still another aspect of the present invention, there is provided a selective retransmission method, by which a receiving side medium access control (MAC) layer receives packets of an MPEG-2 frame, including: (a) initializing a selective automatic retransmission request (ARQ) operation mode; (b) receiving a selective automatic retransmission request (ARQ) start message, and allowing a receiving side MAC layer to prepare a retransmission buffer with a window size equal to a number of packets belonging to an I-frame, which is included in the selective ARQ start message and transmitted from a transmitting side MAC layer; (c) setting the selective ARQ operation mode, estimating transmission time of all packets in the I-frame using information regarding the number of packets requiring retransmission, and setting a timer value; (d) determining whether the set time has elapsed, and if the set time has elapsed, determining whether all packets of the I-frame have been received; and (e) if all packets are not received, analyzing sequence numbers of the packets received during the set period of time, and transmitting a retransmission request message including sequence numbers of the packets not received, and resetting a buffer and a timer value for automatic retransmission request (ARQ) mode.

According to yet still a further aspect of the present invention, there is provided a selective retransmission apparatus, in which a receiving side medium access control (MAC) layer receives packets from a transmitting side MAC layer, including: a frame detector for detecting a frame type of the packet; a transmission error detector for detecting any non-received packets due to any transmission error generated during transmission of the packets; and a retransmission function unit for transmitting to the transmitting side MAC layer a retransmission message and sequence number information of the non-received packets if any transmission error exists, according to a detection result from the frame detector, and for receiving the packets through retransmission by the transmitting side MAC layer.

According to an even further aspect of the present invention, there is provided a computer readable medium having embodied thereon computer programs for the above-described methods.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 2002-44304, filed on Jul. 26, 2002, and entitled: "Method of Generating Transmission Control Parameters and Method of Selective Retransmission According to Packet Characteristics," is incorporated by reference herein in its entirety.

Fast data transmission, multicasting, quality of service (QoS), and the like, are important aspects of transmitting digital audio or video signals and performing multimedia communication. Fast data transmission minimizes end-to-end delay, thereby improving the quality of multimedia services, such as video conferencing. In addition, by transmitting data fast, the time a packet is stored in a buffer is shortened, thereby reducing the size of the buffer required. When multimedia services are provided at the same time to various locations, multicasting is used to reduce bandwidths and to reduce overhead in routers and end terminal systems receiving data. For assuring quality of service (QoS), a resource management technique is essentially required. If the resource management is not performed properly in the routers and the end terminal system, a multimedia communication system cannot provide reliable communication services to users.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
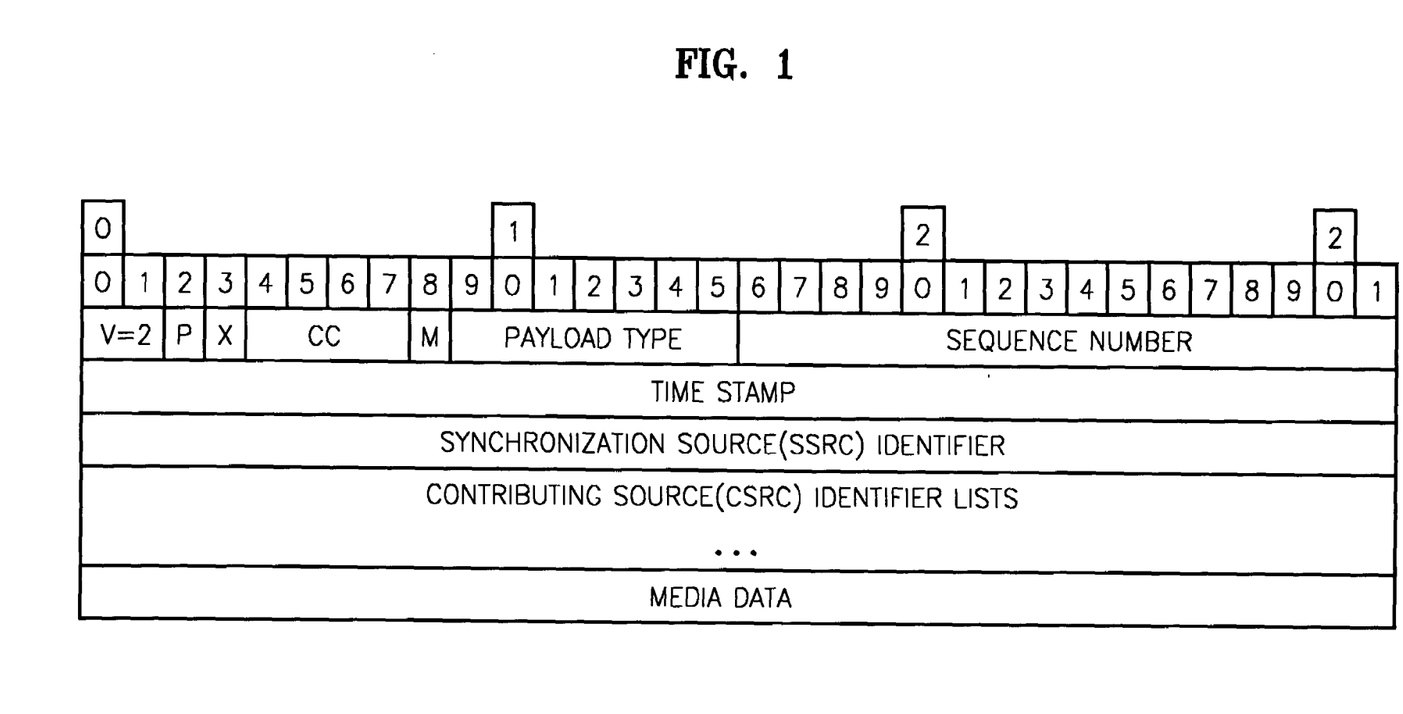
FIG. 1 is a view showing a structure of a data packet used in real-time transport protocol (RTP) according to an embodiment of the present invention.

FIG. 1 is a view showing a structure of a data packet used in real-time transport protocol (RTP) according to an embodiment of the present invention.

In FIG. 1, the version (V) field denotes the RTP version, wherein the latest version is 2.0. In the version field, a value of one is used to indicate the first draft of the RTP specification and a value of zero is used to indicate a protocol implemented according to a vat audio tool. In the P field, P is a value used for constituting a 32-bit-based packet. If the P field is set, this indicates that padding octets are contained in the end portion of the packet. If the X bit is set, this indicates that one extended header follows the fixed header.

Reference character CC represents the number of CSRC identifiers in a fixed header, wherein CSRC represents source information of a real-time protocol (RTP) packet stream that allows an RTP mixer to create a combined stream. The RTP mixer transmits the RTP packets over a network. The RTP mixer is an intermediate system that receives RTP packets from various sources, appropriately combines the RTP packets to create new RTP packets, and transfers the newly created packets to the next system.

The M field represents a space for multimedia information and is used for indicating whether the packet is audio data or video data. The payload type (PT) field represents the payload format of a profile defined in RFC 1890 and determines interpretation by an application. The profile specifies correspondence of a payload type code to a payload format. For example, if the PT value is zero, this indicates PCMU audio encoding; 8,000 Hz sampling rate, and one audio channel. Currently, thirty-three (33) payload types are defined.

The sequence number field contains a sequence number, which is increased by one whenever a RTP packet is transmitted. The sequence number field is used by the receiving side to detect packet loss and to restore the sequence of the packet. The time stamp field represents a time point at which the first octet of the RTP packet is sampled. The Synchronization Source (SSRC) identifier field identifies the synchronization source of the RTP packet. Values of the SSRC identifier field are randomly determined in order to reduce the probability of different transmitting sides having the same SSRC identifier value in the same RTP session. The Contributing Source (CSRC) field identifies a contributing source identifier list, which is added by the RTP mixer. In a case that certain RTP packets are mixed by certain intermediate systems, the SSRC identifier field distinguishes the sources (the intermediate systems) using identifiers stored therein. The SSRC identifier field includes a maximum of fifteen identifiers. If more than fifteen sources exist, only fifteen of the sources are designated and stored in the SSRC identifier field. Media Data represents the media data to be transmitted using the data packet.

Figure 2:
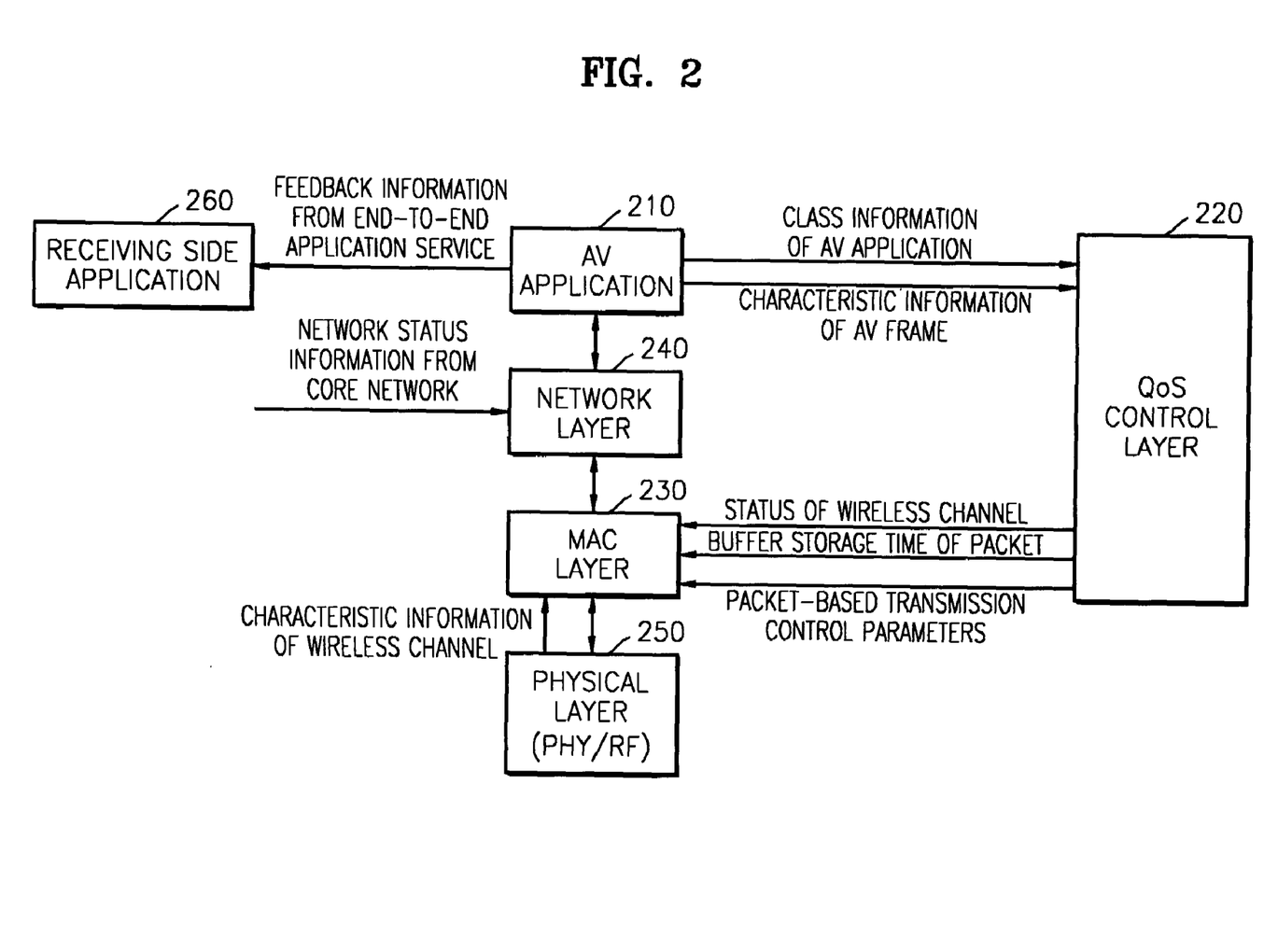
FIG. 2 is a view showing a flow of parameters, which are transmitted between respective layers, in a control structure for Audio-Video (AV) service transport, according to an embodiment of the present invention.

FIG. 2 is a view showing the flow of parameters, which are transmitted between respective layers, in a control structure for Audio-Video (AV) service transmission, according to an embodiment of the present invention.

An AV application 210 converts the characteristic information of received AV data into class information of a session and transfers the converted information to a Medium Access Control (MAC) layer 230 through a QoS control layer 220. The AV application 210 transmits the AV data using Real-time Transport Protocol/Real-time Transfer Control Protocol (RTP/RTCP). A receiving side application 260 uses RTCP to receive data status information, such as data loss and delay time, from a transmitting side and to control the data generation rate. The receiving side application 260 also receives feedback information from end-to-end application service.

RTP is a Real-time Protocol for transmitting real-time data, such as audio and video. RTP does not guarantee real-time transmission of data, but allows application programs to support streaming media. The RTP is implemented on a user datagram protocol (UDP).

RTCP is a protocol used in conjunction with RTP for maintaining QoS of the media data transmitted using RTP. RTP controls only data transmission, whereas RTCP monitors data transmission and also controls transmission of information related by sessions. RTP nodes transmit RTCP packets to each other in order to analyze the status of the network and periodically report any network traffic.

Both RTP and RTCP are implemented on a UDP, providing the time information and synchronization functions that are required for real-time media applications. For these reasons, most applications (VOD service, AOD service, Internet broadcasts, video conference service, and the like) that involve real-time media information over the Internet presently use RTP and RTCP.

In addition, a network layer 240 receives network status information from a core network and controls the amount of AV data to be transmitted. The MAC layer 230 receives class information of the AV application from the AV application 210 through the QoS control layer 220, characteristic information of a wireless channel from the physical layer 250, information for buffer storage time of transmission frames, and the like, and on the basis of the received information performs scheduling for accessing wireless resources.

In the MAC layer 230, only the class information is provided and used as a parameter for setting characteristics of the application. However, the class information cannot reflect characteristics of the AV frames. For example, to reduce the amount of video data transmitted, MPEG-2 uses an I-frame (Intra-coded frame), which includes current picture information, and a B-frame (Bidirectional-coded frame), which includes only that information that is different between the I-frame and a previous frame. The amount of data of an I-frame, which serves as a reference, is relatively large. The amount of data of a B-frame is relatively small and therefore may be transmitted many times between I-frames.

If an error is generated in a single B-frame, a momentary error is generated in a moving picture. However, if an error is generated in a single I-frame, errors are generated in the moving pictures represented by a plurality of B-frames following the I-frame. Therefore, to maintain QoS of the AV service, even in a poor channel environment, transmission probability of the I-frame should be higher than that of the B-frame.

Input parameters received from the AV application include the session class information from the AV application, the characteristic information of respective AV frames, the status information of wireless channels, and the buffer storage time information. The QoS control layer generates output parameters on the basis of the input parameters. The output parameters include packet-based transmission control parameters.

Figure 3:
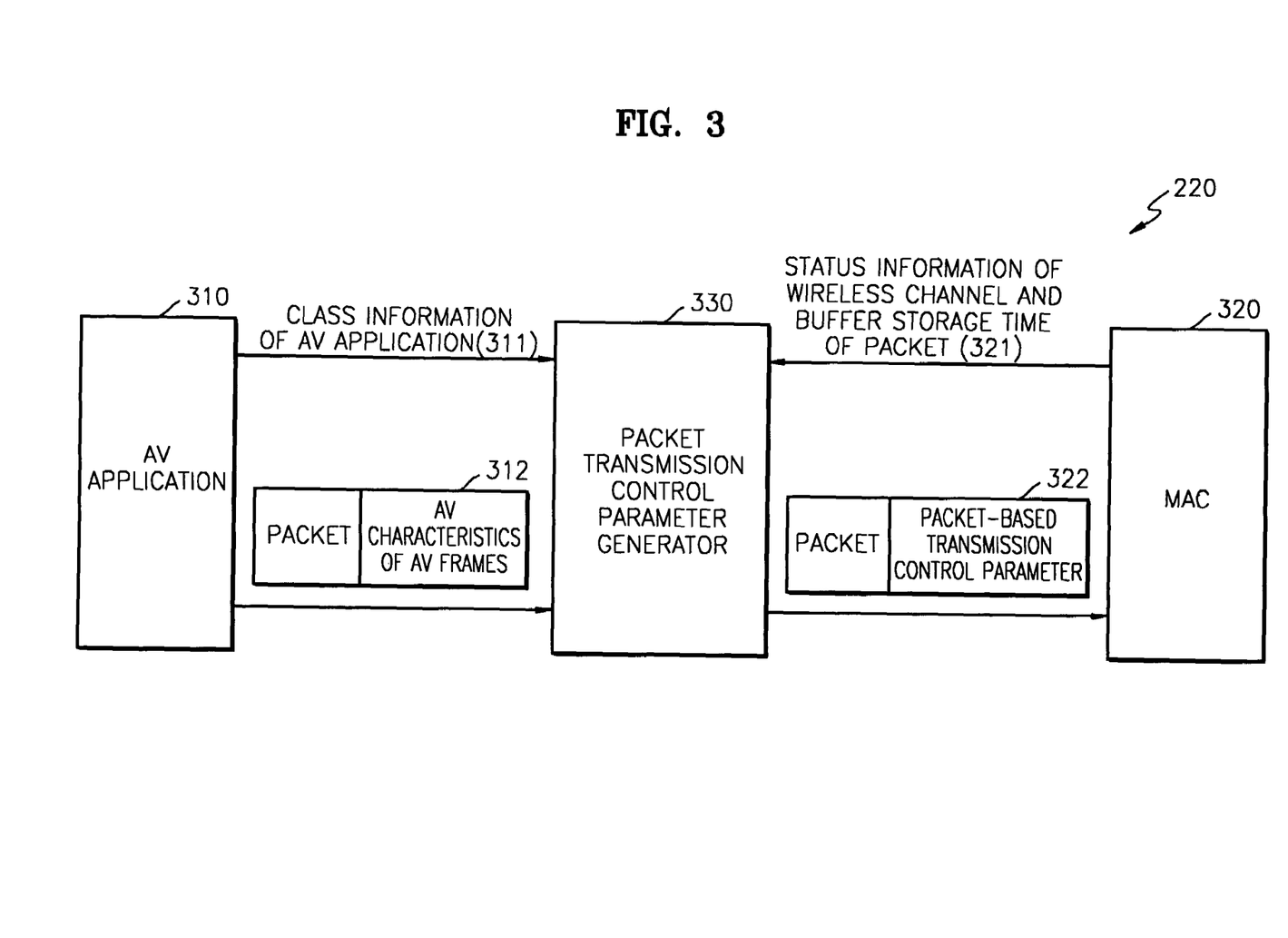
FIG. 3 is a view showing a flow of parameters in a Quality of Service (QoS) control layer, which is used for dynamically allocating transmission control parameters to packets according to an embodiment of the present invention.

FIG. 3 is a view showing a structure of the QoS control layer 220, which is used for dynamically allocating transmission control parameters to packets according to an embodiment of the present invention.

Data, generated by an AV application 310, includes a descriptor representing characteristics of a packet and is transmitted to a packet transmission control parameter generator 330 of the QoS control layer. The descriptor includes class information 311 of a corresponding session designated by the AV application 310 and characteristic information 312 of a corresponding AV frame. The packet transmission control parameter generator 330 of the QoS control layer generates packet-based transmission control parameters 322 on the basis of the above-described information, receives buffer status information 321 of a packet from a MAC layer 320, and attaches the packet-based transmission control parameters 322 to the packet descriptors.

The packet-based transmission control parameters 322 include maximum allowable buffer storage time information of the packets, difference information between the maximum allowable transmission times of the packets, priority level information, retransmission information of the packets, and importance information of the packets.

The priority level information of the packets, the retransmission information of the packets, and the importance information of the packets are dynamically designated according to a buffer status of the MAC layer. The priority level information is used for maintaining fairness of respective AV services. The retransmission and importance information of the packets reflect various characteristics of AV frames indicating selective retransmission of the packet, selective discarding of the packet, forward error correction (FEC) of the packet, multi-copy use of the packet, etc. The generated transmission control parameters (packets and descriptors) are used in scheduling and performing transmission control of packets, while also assuring QoS in the MAC layer.

Figure 4:
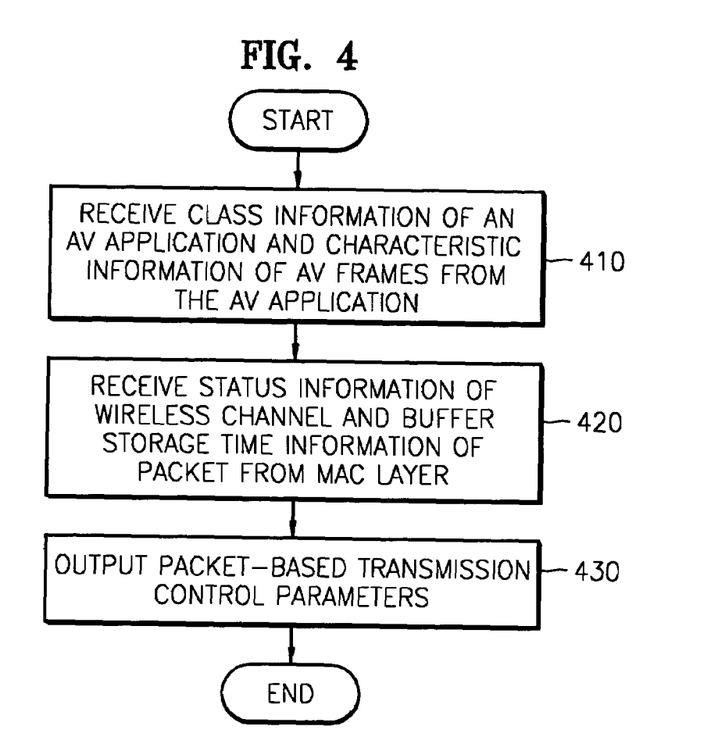
FIG. 4 is a flow chart illustrating a method of generating packet-based transmission control parameters according to an embodiment of the present invention.

FIG. 4 is a flow chart illustrating a method of generating packet-based transmission control parameters according to an embodiment of the present invention.

First, in step 410, class information of an AV application and characteristic information of an AV frame are input from the AV application. The class information of the AV application and the characteristic information of the AV frame represent characteristics of a received packet and are contained in an identifier of the data packet.

Then, in step 420, status information of a wireless channel and buffer storage time information are input from the MAC layer.

Successively, on the basis of the input information, in step 430, packet-based transmission control parameters are generated and output. The transmission control parameters include maximum allowable buffer storage time information of the packets, difference information between maximum allowable transmission times of the respective packets, priority level information, retransmission information of the packets, and importance information of the packets.

Figure 5:
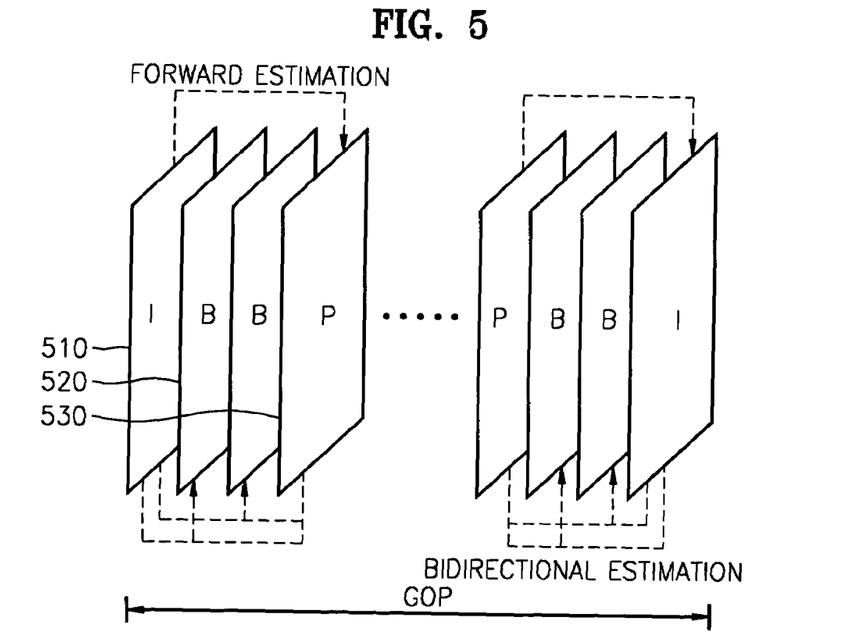
FIG. 5 is a view showing an arrangement and transmission sequences of MPEG-2 frames.

FIG. 5 is a view showing an arrangement and transmission sequences of MPEG-2 frames.

Referring to FIG. 5, to reduce the data transmission amount of real-time moving pictures, MPEG-2 uses I-frames 510 that include information for a current picture, B-frames 520 that include only that information that is different between the I-frame and a previous frame, and P-frames (Predictive-coded frames) 530 that are coded using information of a previous I-frame and a previous P-frame. As described above, the amount of data of the I-frame 510, which serves as a reference frame, is relatively large. The amount of data of B-frames or P-frames are each relatively small and therefore may be transmitted many times between the I-frames 510. A group consisting of one I-frame 510 and a plurality of B-frames and P-frames following the I-frame 510 is called a GOP (Group of Pictures). An I-frame is encoded without reference to any frame and serves as a random access point in the sequence. A P-frame is coded with reference to the last I-frame or P-frame, this process is known as forward estimation. A B-frame is coded with reference to the last and next non-B-frame, this process is known as bi-directional estimation.

In MPEG-2, all of the frames are not compressed into independent still pictures, but each frame is compressed using the similarities between adjacent frames. MPEG-2 uses estimation and interpolation for difference compensation between the adjacent frames. Meanwhile, in MPEG-2 video, frames which can be restored using only their own information must be inserted regularly. This is due to various reasons, including situations that require VCR-type control, such as arbitrary access. These frames are compressed using a still-picture compression method such as the Joint Photographic Expert Group (JPEG).

The I-frame can be placed at any location in a video data stream, is used for arbitrary access of data, and is encoded without referencing different images. The I-frames are generally compressed using JPEG. However, for real-time compression, the I-frames may be compressed using MPEG-2. The I-frame has the lowest compression rate among MPEG-2 frames. The I-frame is divided into 8×8 blocks of a macroblock and is subjected to a discrete cosine transformation (DCT) for generating DCT coefficients. The DCT coefficients are encoded using a different pulse code modulation (DPCM) method, in which difference values between successive blocks are calculated and are transformed using a variable length coding.

During encoding and decoding, the P-frame 530 is generated using information of the previous I-frame and the previous P-frame. In most cases, when any one object on successive images is moved, image blocks of the object are moved in different directions without change of object shape. In this regard, the P frame is generated by encoding only difference values between a previous picture and a current picture, considering that the difference between the previous picture and the current picture is very small.

During encoding and decoding, the B-frame 520 is generated using all information of the previous and following I-frames and P-frames. By using the B-frames, a high compression rate can be obtained. The B-frame has difference values between the previous I-frame or P-frame and the following I-frame or P-frame.

If an error is generated during transmission of a B-frame, a blur of the corresponding moving picture is generated only until the next B-frame is transmitted. Alternatively, if an error is generated during transmission of an I-frame, even though the transmission of B-frames following the I-frame is complete, a blur of the corresponding moving picture is generated until the next I-frame is transmitted. Therefore, when any error is generated during the transmission of the I-frame, transmitting the following B-frames involves unnecessary resource allocation.

Accordingly, to maintain QoS of an AV service under a poor channel environment, it is necessary to increase transmission probability of the I-frame more than the B-frame. However, since a conventional wireless communication system statically determines transmission control parameters using characteristics for each session, it cannot reflect the different characteristics of MPEG-2 frames. In such a wireless communication system, even though an error is generated during data transmission, I-frames and B-frames are processed in the same way. Therefore, no difference exists between error probability of the I-frame and that of the B-frame, which deteriorates QoS of the AV service.

Therefore, the present invention proposes a method in which characteristics of received frames are transferred to the MAC layer and a retransmission mechanism is provided according to the characteristics. Using such a method keeps the error probability of the I-frame lower than that of the B-frame, which improves QoS.

Figure 6:
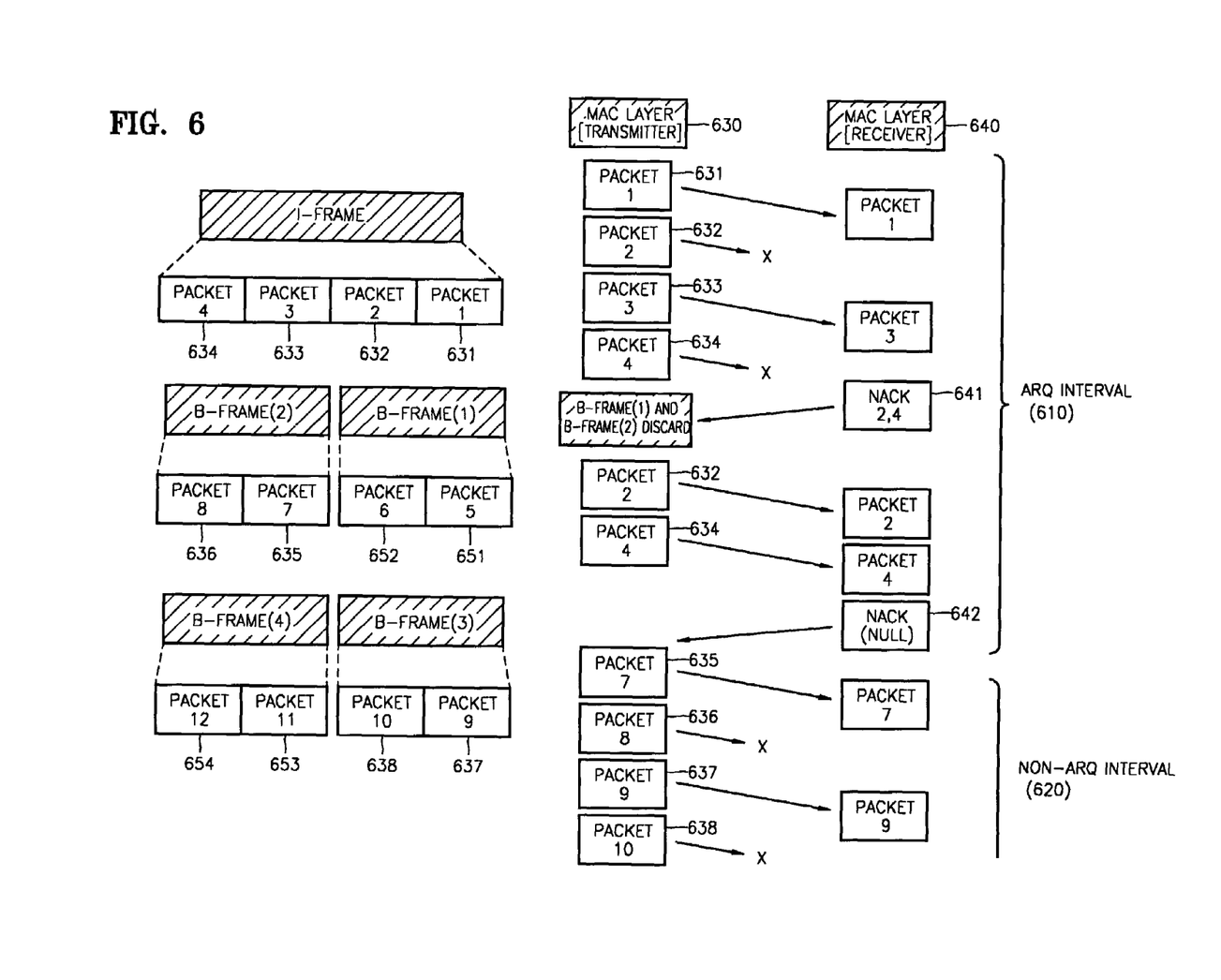
FIG. 6 is a view for describing a window-based selective automatic retransmission request (ARQ) method according to an embodiment of the present invention.

FIG. 6 is a view illustrating a window-based selective automatic retransmission request (ARQ) method, according to an embodiment of the present invention.

As shown in FIG. 6, I-frames of MPEG-2 are transmitted in an automatic retransmission request (ARQ) interval 610. Accordingly, when an error is generated during the transmission of the I-frames, the I-frames are retransmitted using a window-based selective automatic retransmission request (ARQ) method. In contrast, B-frames of MPEG-2 are transmitted in a non-ARQ interval 620. Accordingly, the B-frames are not retransmitted when an error is generated during the transmission.

A transmitting side MAC layer 630 sequentially sends a first packet 631, a second packet 632, a third packet 633, and a fourth packet 634 of an I-frame to a receiving side MAC layer 640. At this time, if only the first packet 631 and the third packet 633 are received without error and the second packet 632 and the fourth packet 634 are not received, then the receiving side MAC layer 640 sends a retransmission request message (NACK 2,4) 641 for non-received packets to the transmitting side MAC layer 630. Then, the transmitting side MAC layer 630 discards packets (i.e., a fifth packet 651 and a sixth packet 652) of the following B-frame and starts retransmission of the I-frame. The number of packets discarded equals the number of packets subject to the retransmission request. That is, the transmitting side MAC layer retransmits the non-received packets, the second packet 632 and the fourth packet 634.

After all packets of the I-frame are received in the ARQ interval, the receiving side MAC layer 640 sends a transmission completion message (NACK (NULL)) 642 to the transmitting side MAC layer 630. Then, the transmitting side MAC layer 630 transmits seventh packets 635 through 638 of a B-frame in the non-ARQ interval 620. Although some packets of the B-frame, such as the eighth packet 636 and the tenth packet 638, are lost during transmission, the receiving side MAC layer 640 does not require retransmission of the packets by the transmitting side MAC layer 630. Accordingly, only the seventh packet 635 and the ninth packet 637 are received. Subsequently, the eleventh packet 653 and the twelfth packet 654 will be transmitted to the receiving side MAC layer 640. Since the eleventh and twelfth packets 653 and 654 are B-frame packets, if they are not received by the receiving side MAC layer 640, they are not retransmitted.

Figure 7A:
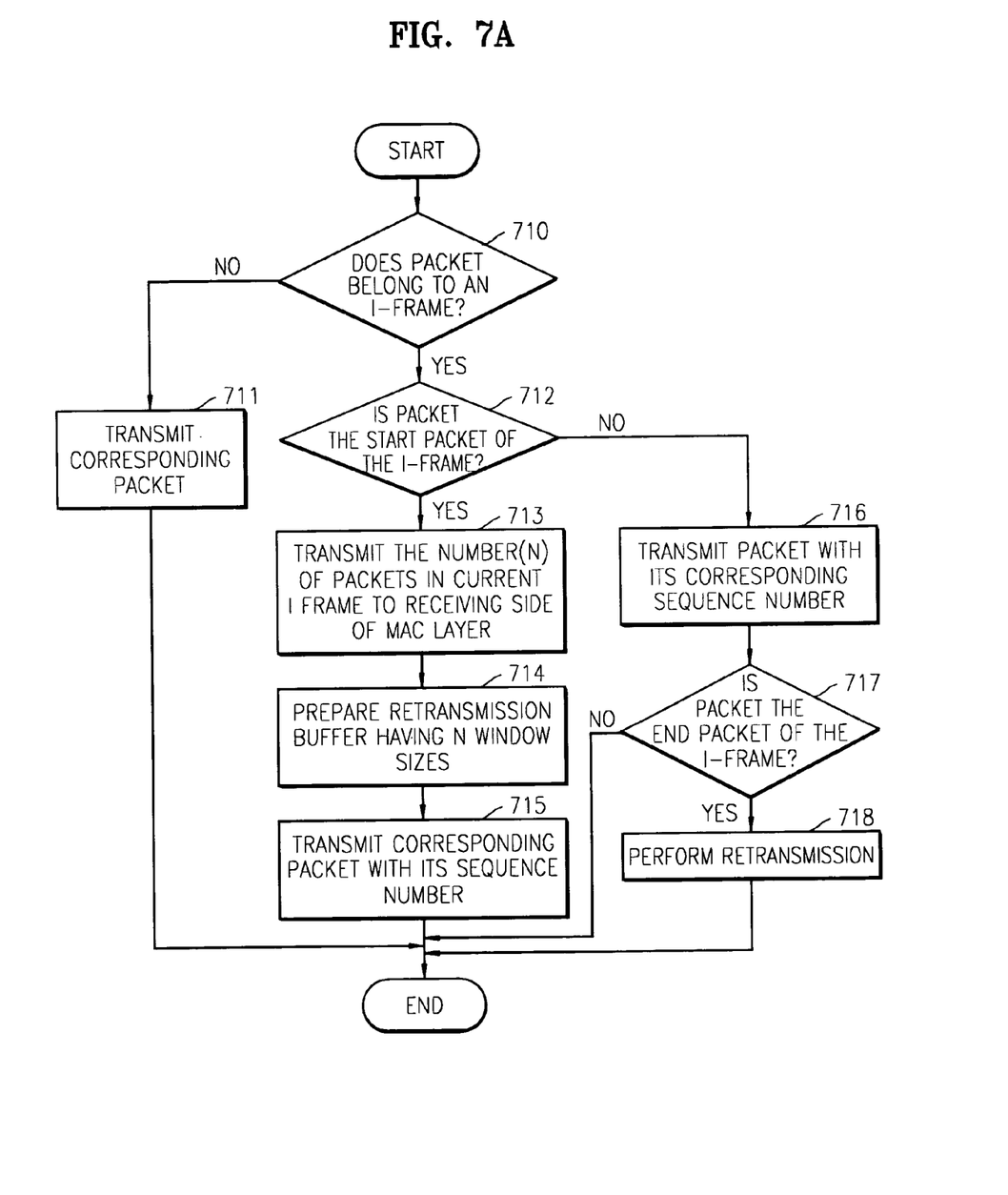
FIG. 7A is a flow chart illustrating an operation of the transmitting side Medium Access Control (MAC) layer according to an embodiment of the present invention.

FIG. 7A is a flow chart illustrating an operation of the transmitting side MAC layer 630 according to an embodiment of the present invention.

A transmitting side MAC layer sends MPEG-2 frames and designates the start and end of the window-based selective automatic retransmission request (ARQ) mode. In step 710, the transmitting side MAC layer determines whether a current packet for transmission belongs to an I-frame. If the packet does not belong to an I-frame, in step 711, the corresponding packet is transmitted, i.e., the packet is transmitted "as-is." If the packet belongs to an I-frame, in step 712, it is determined whether the packet is the start packet of the I-frame. If the packet is the start packet of the I-frame, in step 713, an automatic retransmission request (ARQ) start message, which includes the number of packets belonging to the I-frame, is transmitted to a receiving side MAC layer. Then, in step 714, a buffer with N window size is prepared for use in the ARQ mode. In step 715, the packet is transmitted together with a sequence number thereof. After the final packet of the I-frame is transmitted, non-ARQ mode starts.

If the packet is not the start packet of the I-frame, in step 716, the packet is transmitted together with the sequence number thereof. Next, in step 717, it is determined whether the packet is the final packet of the I-frame. If the packet is the final packet of the I-frame, in step 718, retransmission of the packet is performed. If the packet is not the final packet of the I-frame, ARG mode continues and the process for transferring a next packet starts.

Figure 7B:
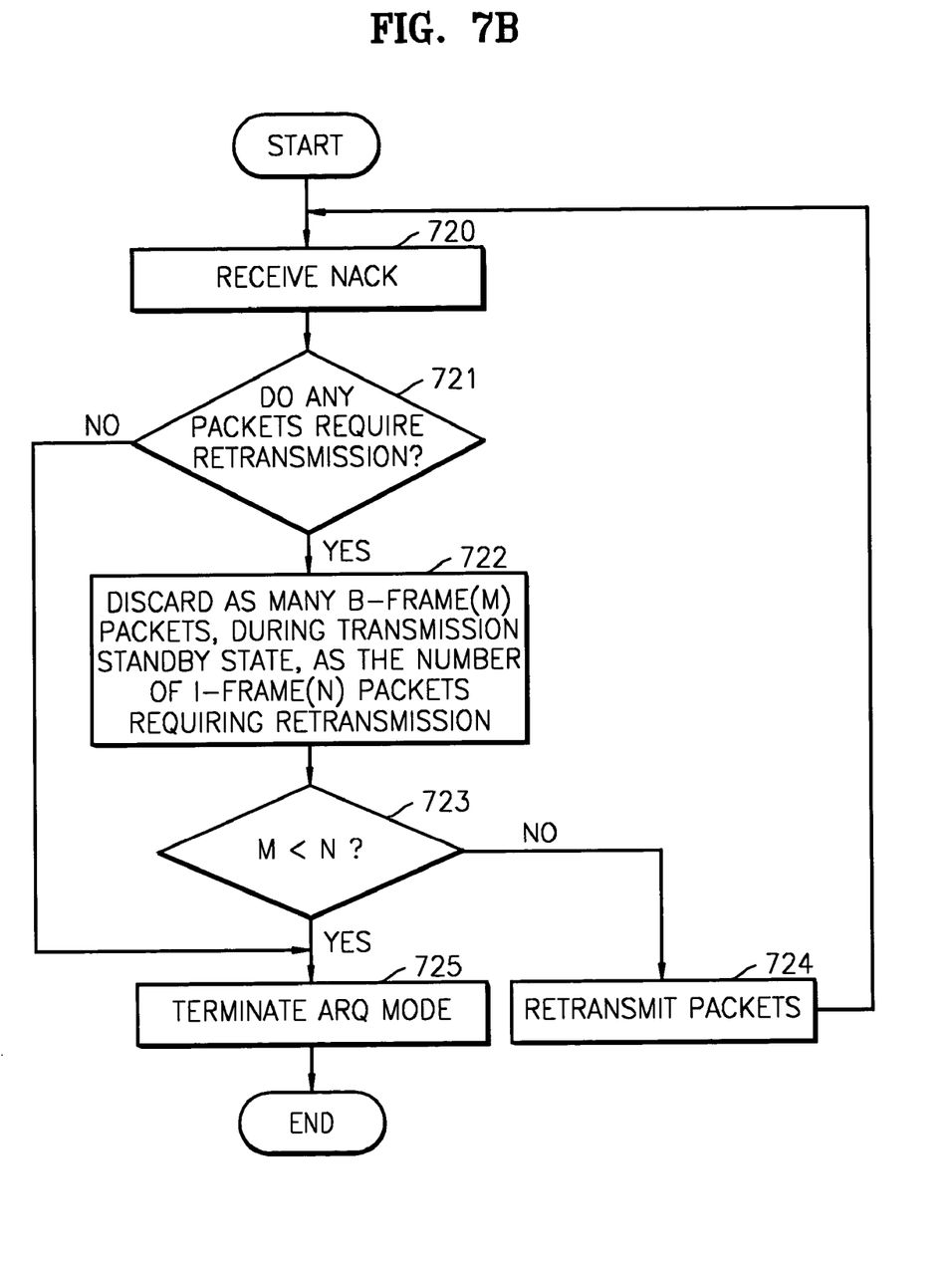
FIG. 7B is a flow chart illustrating an operation of the transmitting side MAC layer during automatic retransmission request (ARQ) mode according to an embodiment of the present invention.

FIG. 7B is a flow chart illustrating an operation of the transmitting side MAC layer during ARQ mode according to an embodiment of the present invention.

Referring to FIG. 7B, first, in step 720, the transmitting side of the MPEG-2 frame receives a NACK (retransmission request). Then, in step 721, it is determined whether any packets require retransmission. If any packets require retransmission, in step 722, packets of the following B-frame during transmission standby state, are discarded, where the number of B-frame packets discarded is equal to the number of I-frame packets to be retransmitted. Successively, in step 723, it is determined whether the number of B-frame packets is below the number of packets subject to the retransmission request. If the number of B-frame packets is not below the number of packets subject to retransmission request, in step 724, the packets subject to the retransmission request are transmitted and the next NACK is awaited. This process is then repeated. This repeated process ends when a NACK (NULL) is received, indicating termination of the ARQ mode. If the number of B-frame packets is less than the number of packets subject to the retransmission request, this indicates that the I-frame packets are not transmitted during a GOP interval. In this case, in step 725, the ARQ mode is immediately terminated in order to transmit the next I-frame.

Figure 8:
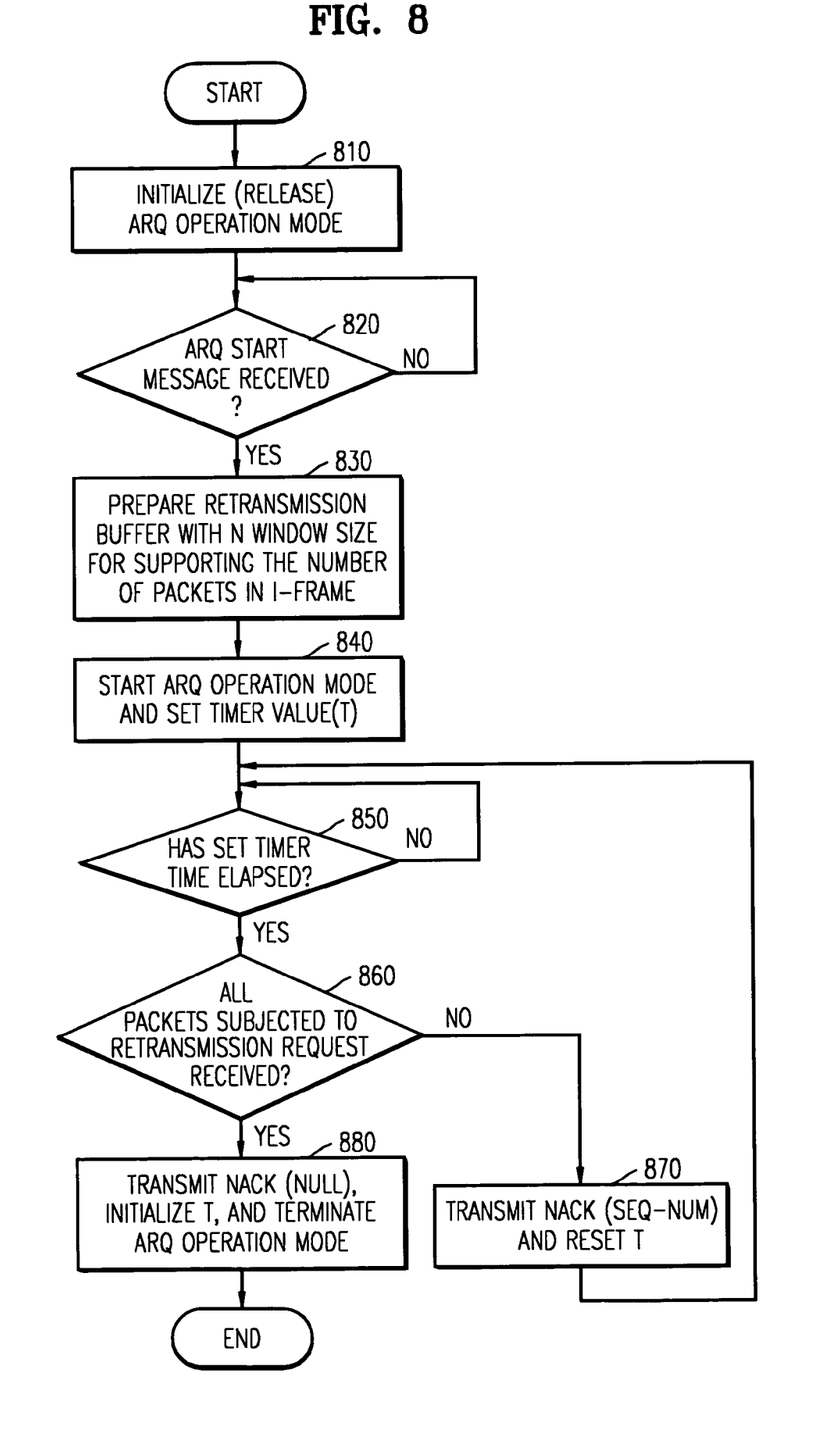
FIG. 8 is a flow chart illustrating an operation of the receiving side MAC layer according to an embodiment of the present invention.

FIG. 8 is a flow chart illustrating an operation of the receiving side MAC layer according to an embodiment of the present invention.

Referring to FIG. 8, first, in step 810, the ARQ operation mode is initialized. Then, in step 820, it is determined whether an ARQ start message has been received. If an ARQ start message has been received, in step 830, the receiving side MAC layer prepares a retransmission buffer with N window size for supporting the number (N) of I-frame packets indicated in the ARQ start message sent from the transmitting side. Then, in step 840, the ARQ operation mode is initiated and a timer value (T) is set by estimating the time for complete transmission of all I-frame packets, using the number of packets indicated by the transmitting side.

Then, in step 850, it is determined whether the set time has elapsed. After the set time has elapsed, in step 860, it is determined whether all packets subject to the retransmission request are received. At this time, the sequence numbers of the packets transmitted during the set time period are analyzed. If any packets are designated as lost, in step 870, a NACK with the corresponding sequence numbers is transmitted, and the buffer and the timer value for the ARQ transmission mode are reset. If no packets require retransmission and all transmitted packets are received, in step 880, a NACK (NULL) is transmitted and the ARQ mode is terminated.

Figure 9:
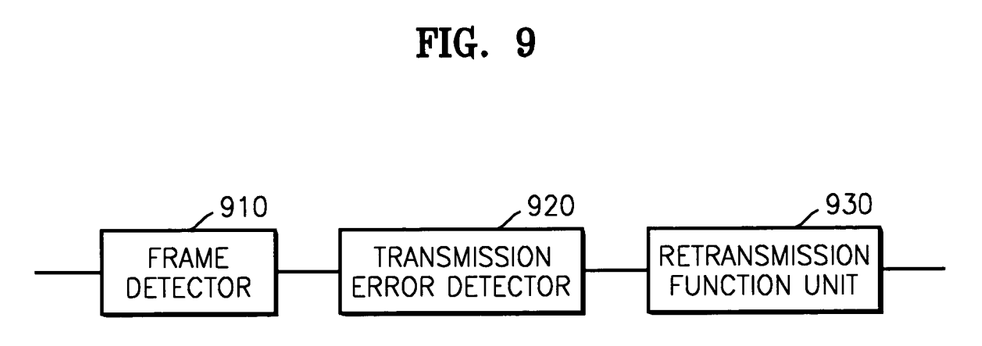
FIG. 9 is a view showing a selective retransmission apparatus according to an embodiment of the present invention.

FIG. 9 is a view schematically showing a selective retransmission apparatus according to an embodiment of the present invention.

Referring to FIG. 9, the apparatus allows a receiving side MAC layer to receive packets from a transmitting side MAC layer and includes a frame detector 910, which detects the frame to which the received packet belongs.

That is, the frame detector 910 determines whether the packet belongs to an I-frame, or a B-frame, or any other frame.

A transmission error detector 920 determines whether any packets are missing due to an error during the transmission of the packets.

If any transmission error is detected, a retransmission function unit 930 transmits a retransmission message and sequence number information of the non-received packets to the transmitting side MAC layer, according to the determination result of the frame detector 910. The retransmission function unit 930 receives the packets through retransmission from the transmitting side MAC layer. The packets are retransmitted only if the packets received by the frame detector 910 belong to an I-frame.

The above-described exemplary embodiments may be embodied as computer programs and may also be embodied in a general-purpose digital computer for executing the computer programs using a computer readable medium. The computer readable medium includes storage media, such as magnetic storage media (e.g., ROMs, floppy discs, hard discs, and the like), optically readable media (e.g., CD-ROMs, DVDs, and the like). The present invention may be embodied in a computer readable medium having a computer readable program code unit embodied therein for causing a number of computer systems connected via a network to effect distributed processing.

As described above, according to the present invention, it is possible to efficiently support an AV service in wireless communication, by dynamically controlling transmission control parameters according to a buffer status when packets are generated and by using a packet-based transmission control method for reflecting characteristics of AV frames. In addition, AV applications, according to the present invention, are standardized to provide packet-based control parameters regardless of various wireless access control layers. Therefore, the AV applications can be applied to various systems.

Further, according to the selective ARQ method of the present invention for real-time transmission of MPEG-2 frames, since the characteristics of the MPEG-2 frames are transferred to the MAC layer and the MAC layer performs the selective retransmission of the frames according to the characteristics thereof, an error probability of the I-frame can be lower than that of the B-frame, which improves quality of service (QoS). Moreover, the wireless MAC layer can manage resources efficiently through packet management on the transmitting side and timer use on the receiving side.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A selective retransmission method, comprising:
    (a) transmitting packets of an MPEG-2 frame in real-time, the packets of the MPEG-2 frame including one or more I-frame packets and one or more non I-frame packets;
    (b) checking for any transmission error in the transmitted one or more I-frame packets-and determining a number of non-received I-frame packets resulting from a transmission error; and
    (c) if any transmission error is generated, prior to transmission of subsequent packets of a subsequent MPEG-2 frame including one or more subsequent I-frame packets and one or more subsequent non I-frame packets, discarding a number of the subsequent non I-frame packets equal to the number of non-received I-frame packets resulting from the transmission error, and retransmitting the non-received I-frame packets as part of the subsequent packets of the subsequent MPEG-2 frame in place of the discarded subsequent non I-frame packets.

2. The method as claimed in claim 1, further comprising during real-time transmission of the packets of the MPEG-2 frame, packets belonging to the I-frame are transmitted in an automatic retransmission request (ARQ) interval, and packets not belonging to the I-frame are transmitted in a non-automatic retransmission request (non-ARQ) interval.

3. A selective retransmission method for transmitting data of an MPEG-2 frame, comprising:
    (a) allowing a transmitting side medium access control (MAC) layer to transmit packets belonging to an I-frame to a receiving side MAC layer;
    (b) after all packets belonging to the I-frame are transmitted, allowing the receiving side MAC layer to output to the transmitting side MAC layer a retransmission request for non-received packets due to any transmission error generated during transmission of the packets;
    (c) allowing the transmitting side MAC layer, which received the retransmission request, to discard a number of packets of a B-frame following the I-frame, wherein the number of discarded packets of the B-frame equals a number of packets subject to the retransmission request; and
    (d) retransmitting the packets subject to the retransmission request.

4. A selective retransmission method, by which a transmitting side medium access control (MAC) layer transmits packets of an MPEG-2 frame, comprising:
    (a) determining whether a packet, to be currently transmitted by the transmitting side MAC layer, belongs to an I-frame;
    (b) if the packet does not belong to the I-frame, transmitting the packet as is, and if the packet belongs to the I-frame, determining whether the packet is a start packet of the I-frame;
    (c) if the packet is the start packet of the I-frame, transmitting to a receiving side MAC layer an automatic retransmission start message including the number of packets belonging to the I-frame; and
    (d) preparing a buffer for use in an automatic retransmission request (ARQ) mode and transmitting the packets with their respective sequence numbers.

5. The selective retransmission method as claimed in claim 4, wherein (c) comprises:
    (c1) if the packet is not the start packet of the I-frame, transmitting the packets with their respective sequence numbers;
    (c2) determining whether the packet is an end packet of the I-frame;
    (c3) if the packet is the end packet of the I-frame, performing retransmission of the packet; and
    (c4) if the packet is not the end packet of the I-frame, starting the ARQ mode to transmit a next packet of an I-frame.

6. A selective retransmission method, by which a transmitting side medium access control (MAC) layer transmits packets of an MPEG-2 frame, comprising:
    (a) starting an automatic retransmission request (ARQ) mode, and receiving a retransmission message of an MPEG-2 frame and sequence numbers of packets requiring retransmission, from a receiving side MAC layer;

(b) receiving the retransmission message and the sequence numbers, determining whether any packets require retransmission, and if any packet requires retransmission, discarding a number of packets of a B-frame during a transmission standby state, wherein the number of discarded packets of the B-frame equals a total number of packets requiring retransmission; and (c) determining whether the number of the packets of the B-frame is less than the total number of packets requiring retransmission, and if the number of packets of the B-frame is not less than the total number of packets requiring retransmission, then retransmitting the packets and awaiting a next retransmission message.

7. The method as claimed in claim 6, wherein in (b), if no packet requires retransmission, terminating an ARQ mode.

8. The method as claimed in claim 6, wherein in (c), if the number of packets of the B-frame is less than that of the packets requiring retransmission, terminating an ARQ mode.

9. The method as claimed in claim 3, wherein transmitting the retransmission request comprises:

initializing a selective automatic retransmission request (ARQ) operation mode;

receiving a selective automatic retransmission request (ARQ) start message, and allowing the receiving side MAC layer to prepare a retransmission buffer with a window size equal to a number of packets belonging to the I-frame, which is included in the selective ARQ start message and transmitted from the transmitting side MAC layer;

setting the selective ARQ operation mode, estimating transmission time of all packets in the I-frame using information regarding the number of packets requiring retransmission, and setting a timer value;

determining whether the set time has elapsed, and if the set time has elapsed, determining whether all packets of the I-frame have been received; and if all packets are not received, analyzing sequence numbers of the packets received during the set period of time, and transmitting a retransmission request message including sequence numbers of the packets not received, and resetting a buffer and a timer value for automatic retransmission request (ARQ) mode.

10. The method as claimed in claim 9, wherein, if all packets are received and no packet requires retransmission, further comprising:

transmitting a retransmission message including no sequence numbers (NULL); and terminating the ARQ mode.

11. A computer readable medium having embodied thereon a computer program for the method according to claim 1.

12. A selective retransmission apparatus, in which a receiving side medium access control (MAC) layer receives packets of an MPEG-2 frame from a transmitting side MAC layer, comprising:

a frame detector adapted to detect whether a frame type of the packet is an I-frame;

a transmission error detector adapted to detect any non-received I-frame packets due to any transmission error generated during transmission of the I-frame packets; and a retransmission function unit adapted to output to the transmitting side MAC layer a retransmission message and sequence number information of the non-received I-frame packets if any transmission error exists, and to receive the non-received I-frame packets through retransmission by the transmitting side MAC layer in place of an equal number of subsequent non I-frame packets of a subsequent MPEG-2 frame.

13. The apparatus as claimed in claim 12, wherein the non I-frame packets include B-frame packets or P-frame packets of the subsequent MPEG-2 frame.

14. The apparatus as claimed in claim 12, wherein the retransmission function unit includes a retransmission buffer with a window size equal to a number of packets belonging to the I-frame.

15. The apparatus as claimed in claim 12, wherein, when a number of non-received I-frame packets exceeds the number of subsequent non I-frame packets, the retransmission function unit ends retransmission.

16. The method as claimed in claim 6, wherein transmitting the retransmission request comprises:

allowing the receiving side MAC layer to prepare a retransmission buffer with a window size equal to a number of packets belonging to an I-frame transmitted from the transmitting side MAC layer;

estimating transmission time of all packets in the I-frame using information regarding a number of packets requiring retransmission, and setting a timer value;

determining whether the set time has elapsed, and if the set time has elapsed, determining whether all packets of the I-frame have been received; and if all packets are not received, analyzing sequence numbers of the packets received during the set time, and transmitting a retransmission request message including sequence numbers of the packets not received, and resetting a buffer and a timer value.

17. The method as claimed in claim 16, wherein, if all packets are received and no packet requires retransmission, further comprising:

transmitting a retransmission message including no sequence numbers (NULL); and terminating the ARQ mode.

* * * * *